(12) United States Patent
Raja (10) Patent No.: US 7,447,661 B2
(45) Date of Patent: Nov. 4, 2008

(54) ELECTRONIC BEARER BOND ONLINE TRANSACTION SYSTEM

(76) Inventor: Ahsan I. Raja, 11570 St. Andrews La., Carmel, IN (US) 46032

( * ) Notice: Subject to any disclaimer, the term of this patent is extended or adjusted under 35 U.S.C. 154(b) by 405 days.

(21) Appl. No.: 09/910,756

(22) Filed: Jul. 24, 2001

(65) Prior Publication Data

US 2002/0016766 A1  Feb. 7, 2002

Related U.S. Application Data

(60) Provisional application No. 60/220,195, filed on Jul. 24, 2000.

(51) Int. Cl.
G06Q 30/00 (2006.01)
(52) U.S. Cl. .............. 705/40; 705/14; 705/26; 705/27; 705/37; 705/39; 705/41; 705/67; 705/69; 235/379; 235/380
(58) Field of Classification Search .......... 705/26, 705/27, 37, 39, 40, 41, 67, 69, 14; 235/379, 235/380
See application file for complete search history.

(56) References Cited

U.S. PATENT DOCUMENTS

| | | | |
|---|---|---|---|
| 5,802,497 A | 9/1998 | Manasse | 705/27 |
| 5,832,089 A | 11/1998 | Kravitz et al. | 380/24 |
| 5,883,810 A | 3/1999 | Franklin et al. | 364/479.02 |
| 5,897,621 A * | 4/1999 | Boesch et al. | 705/26 |
| 5,901,229 A | 5/1999 | Fujisaki et al. | 380/30 |
| 5,903,880 A | 5/1999 | Biffar | 705/39 |
| 5,930,777 A | 7/1999 | Berber | 705/40 |
| 6,014,646 A | 1/2000 | Vallee et al. | 705/39 |
| 6,021,399 A | 2/2000 | Demers et al. | 705/39 |
| 6,029,150 A | 2/2000 | Kravitz | 705/39 |
| 6,047,269 A | 4/2000 | Biffar | 705/39 |
| 6,058,381 A | 5/2000 | Nelson | 705/40 |
| 6,078,902 A | 6/2000 | Schenkler | 705/35 |
| 6,138,107 A * | 10/2000 | Elgamal | 705/39 |
| 6,343,284 B1* | 1/2002 | Ishikawa et al. | 705/67 |
| 6,370,514 B1* | 4/2002 | Messner | 705/14 |
| 6,467,684 B2* | 10/2002 | Fite et al. | 235/379 |
| 6,473,500 B1* | 10/2002 | Risafi et al. | 379/144.01 |
| 6,505,171 B1* | 1/2003 | Cohen et al. | 705/26 |

\* cited by examiner

*Primary Examiner*—Nga B. Nguyen
(74) *Attorney, Agent, or Firm*—Staas & Halsey LLP (57) ABSTRACT

An electronic transaction system, comprising bearer bond means for providing an online electronic bearer bond having a monetary value, transaction means for performing monetary transactions with said bearer bond means, and network means for providing user access to said bearer bond means and said transaction means.

12 Claims, 6 Drawing Sheets

ELECTRONIC BEARER BOND ONLINE TRANSACTION SYSTEM

CROSS-REFERENCE TO RELATED APPLICATION

This application is related to and claims priority to U.S. application entitled Electronic Bearer Bond Online Transaction System, having Ser. No. 60/220,195,filed Jul. 24, 2000 and incorporated by reference herein.

BACKGROUND OF THE INVENTION

1. Field of the Invention

The present invention generally relates to bearer documents, and, more particularly, to interactive electronic bearer documents and interactive electronic bearer document databases.

2. Description of the Related Art

Generally, cash, or hard currency, is the most widely used and acceptable form of payment for non-electronic transactions worldwide. For electronic transactions, however, such as e-commerce transactions, cash as a form of payment may not be used. Instead, payment for electronic transactions is generally provided by a credit card account or bank account which is directly linked to the identity of a purchaser involved in the electronic transaction.

However, several problems exist with current e-commerce transaction settlement systems. For instance, users may be unwilling to purchase certain items on-line as the purchase of such items is directly linked to their identity. Current e-commerce settlement systems do not provide the buyer with anonymity, as cash normally provides for regular off-line purchases. Further, a majority of the world's population do not have access to credit card or bank accounts, and, therefore, may not perform electronic transactions at all.

Therefore, a need exists for a method which enables hard currencies to be used as payment in electronic transactions so that purchases may be anonymous. Furthermore, a need exists to eliminate the requirement for purchasers to have credit card or bank accounts to perform everyday electronic transactions.

SUMMARY OF THE INVENTION

It is an aspect of the present invention to make any hard currency of the world equally acceptable to use as payment in an electronic transaction.

It is another aspect of the present invention to allow purchasers to perform electronic transactions without credit card and/or bank accounts.

It is a further aspect of the present invention to provide an interactive electronic bearer document for facilitating the use of hard currencies in electronic transactions.

It is yet another aspect of the present invention to provide an interactive electronic bearer document database for facilitating the use of hard currencies in electronic transactions.

The above aspects can be attained by an electronic transaction system which comprises bearer bond means for providing an online electronic bearer bond having a monetary value, transaction means for performing monetary transactions with the bearer bond means, and network means for providing user access to the bearer bond means and the transaction means.

The above aspects may also be attained by an electronic apparatus adapted for exchanging currency over a network which comprises an electronic document used for performing transactions, wherein the transactions contain data information associated with the electronic document, and a database processing and storing the data information to perform the transactions over the network.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

An interactive electronic bearer document (IEBD) is a unique unit of trade. Similar to a bearer bond, it is payable to whoever possesses it. An IEBD is not linked to any one person's identity. The present invention allows for consumers and merchants to use IEBDs as a method of electronic payment.

IEBDs may be used anywhere the need for a transaction occurs. Furthermore, the IEBDs may be acquired by consumers in their own local currency. Since the IEBDs may be used in any international market, a rate of exchange is applied to each country's currency.

The use and trade of IEBDs is facilitated through the use of a secure Bearer Document Database (BDD). This database processes and stores all information pertaining to and associated with the trade of IEBDs. Owners of IEBDs and merchants may access the database through several different venues including, but not limited to, websites such as the Universal Cash Online (UCO) website, telephone interface systems such as the UCO telephone interface system, and kiosks such as the UCO kiosk.

Advantageously, a multitude of anonymous consumers from many different countries are able to utilize IEBDs and associated UCO products and services regardless of their age or their credit worthiness.

Unlike credit or bank accounts, a UCO consumer is not required to provide any information concerning his or her identity. The IEBDs may be purchased by consumers from various off-line (i.e. brick and mortar) and on-line points of sale including, but not limited to: banks, post offices, internet service providers, retail stores, grocery stores, convenience stores, and web sites such as the UCO web site.

According to an embodiment of the present invention, IEBDs are not valid and may not be used for purchases until they have been authorized by an affiliated vendor. For an IEBD to be authorized, for example, a vendor inputs its Vendor Identification Number (VIN) along with the IEBD account number to authorize the card for use.

IEBDs may be made available to consumers in their local currency. The value of an IEBD is linked to a base currency.

A common base currency which may be selected is U.S. dollars, because U.S. currency is generally universally accepted. The consumer pays an appropriate exchange rate to convert his or her type of currency into the equivalent base currency. Due to the currency exchange features of IEBDs, they become effectively a universally acceptable method of payment.

Advantageously, the present invention allows for a user to set up and activate either a UCO card account, or a credit card account. This is achieved by, for example, the user entering the UCASH web site by selecting account activation, including the type of account to be set up (UCO card or credit card) by entering UCASH card and personal information, by choosing a password, and by receiving an account number on-line, wherein the account number may be either a UCO card account number or a credit card account number, such as a Visa or MasterCard account number.

After an IEBD is authorized, the consumer may use the IEBD to perform electronic transactions. An initial secure PIN is printed on the card, but may be concealed by scratch off or peeler media. In order to perform a transaction, the consumer provides the IEBD account number, the initial PIN, and any other pertinent information printed on the IEBD medium (e.g. date printed, country of purchase, or other information) to the merchant. Advantageously, the UCO consumer has the ability to change the PIN number at any time via the UCO web site or over the phone to further secure access to their funds.

Every transaction which is performed using an IEBD is stored on the BDD. If the proper security information is provided, this information along with other transaction data may be accessed through the UCO web site. The UCO web site also provides additional features for convenience and security including, but not limited to: shopping online, transaction histories, language translations, merchant validation, currency conversions, shippers online, tariff information, anonymous e-mail, bulletin boards, luck draw process, interactive features, and concierges services.

The interactive features allow the owner to control the use of the funds represented by the IEBD. These features may be accessed and activated through a portal such as the UCO web portal. Initial verification information may be supplied to gain limited access to the central transaction database including the account number of the IEBD and a secure PIN.

An individual IEBD has no value until it is authorized by the central transaction BDD. The IEBDs may be authorized through a set of pre-defined protocols, or they may be authorized in a manner prescribed by a BDD operator.

The owner of the IEBD may opt to use all or a portion of the available funds to perform electronic transactions. An authorized amount is deducted from the total amount. The remaining value can be securely "vaulted" until authorized for use.

After card activation, a user may check the balance of his or her card after activation by, for example, selecting the type of card (UCO card or credit card) for the desired balance, providing the chosen card number, providing a password for the debit card accounts, if any, and by viewing the current balance of the chosen card displayed on-screen.

A user is also able to check his or her statement on-line by, for instance, selecting a type of card (UCO card or credit card), providing the chosen card number, providing 0a password for the debit card accounts, if any, and by viewing the statement of the chosen card displayed on-screen. The statement is generated from the transactions stored on the BDD.

Furthermore, a user may transfer funds between accounts. A user may transfer funds from a UCO card account to a debit card account. As a result, the balance of the debt card account may be increased. The user may transfer either the entire remaining balance of the UCO card or fixed portions of the balance to the account. A user may also transfer funds from credit card accounts to a UCO card. Several IEBDs of the same or differing amounts may be consolidated into one IEBD via the web portal. IEBD holders may further secure their funds by providing additional personal information.

A user may authorize a one-time purchase using either a UCO card or credit card. For example, this may be accomplished by the user selecting either a UCO card or credit card, by entering in the account number of the chosen card, by entering in a password for the card, and by selecting a duration and amount for which the one-time purchase will be valid for. Optionally, the user may select certain restrictions on the one-time certificate so that the certificate cannot be used to purchase certain types of goods and/or services. Moreover, the owner of an IEBD may also select where the document may be spent. After all such information is entered, the user is presented with an account number which can be used for a one-time purchase.

Once the certificate is created, an owner of the certificate may use the certificate on-line. The certificate works identically to VISA/MC number, with the advantage that it does not require address/name/or ZIP verification, resulting in anonymous purchases.

Anonymous E-mail Communication is another unique feature that is available through the web site for IEBD holders. This feature allows consumers to create an email account that is linked to their IEBD account. As a result, the e-mail account is not linked to the identity of the holder of the IEBD. IEBD holders may receive or send mail and check their transaction history. They may also use the e-mail platform to facilitate purchases, release their "vaulted" funds, and perform balance transfers to other card accounts.

The UCO e-mail account is linked to the IEBD account and may be initially accessed by the UCO scratch off PIN. Upon activation of the card, the anonymous email accounts remain active as long as they are linked to a valid IEBD account. When the balance of an IEBD is consumed or expired, a new valid IEBD may be linked to an existing e-mail account.

The anonymous e-mail features of the present invention advantageously enable consumers who may not possess an e-mail account or a computer to: communicate with friends and family, receive order reference and confirmation information, and to transfer funds to other UCO cardholders.

Through the use of collaborative filtering techniques, UCO merchants may target anonymous UCO consumers via their anonymous e-mail accounts by their spending habits alone. This customer anonymity encourages spending on the part of the UCO customer, which, in turn, helps merchants to more correctly identify the spending habits of UCO customers.

Furthermore, a UCO Bulletin Board may be accessed from the UCO web site. The UCO Bulletin Board allows for UCO merchants to conduct direct marketing and sales to anonymous UCO cardholders. UCO cardholders searching for the best deal on a particular item may post their request for that item on the bulletin board. Merchants servicing that market are able to browse these requests and respond to the consumer's anonymous e-mail account with an offer to provide the specific requested goods and/or services.

The consumer may then select the best value from several merchants who made offers in response to the consumer's request. This service effectively brings the merchants to the consumers. Therefore, merchants no longer have to wait passively for consumers who have very specific needs to come to them.

UCO Consumer Data Calculators (CDCs) are available to aid UCO consumers as they search and shop online. For instance, a UCO customer is able to convert their IEBDs into any currency of the world, in real time, at the official rates of exchange. Furthermore, the present invention provides comparison shop search engines which query the UCO database. The search engines may be offered to UCO consumers by, for example, the UCO web site. Using the search engines, consumers are able to compare, for example, a US product with its Chinese counterpart. Comparisons detailing the cost of shipping, tariffs, taxes, clearing and forwarding, and time to ship are advantageously available to international consumers and national consumers alike.

The present invention further provides other services to UCO customers, including UCO Purchasing Services. Through the UCO Purchasing Services an IEBD becomes a universally acceptable method of payment. For instance, in the event that a merchant does not accept an IEBD as a method of payment, UCO Purchasing Services provides payment to a merchant on behalf of a UCO customer's IEBD, via a payment method that the merchant does accept (e.g. Visa, MC, AmEx, check, money order, wire transfer, or other form of payment).

In order to facilitate and monitor the trading of Interactive Electronic Bearer Documents (IEBDs), the present invention collects and stores information pertaining to the IEBDs in the BDD.

Every data entry in the BDD is related to an account number of an individual IEBD.

The present invention allows consumers to purchase Universal Cash Online (UCO) cards anonymously online using their credit cards. The process allows online merchants or retailers to sell UCO cards without any knowledge of the unique account identifier or PIN number associated with a UCO card.

The present invention further allows for organizations, including but not limited to ISPs, banks, private label organizations, and credit card companies, to be able to offer UCO cards for sale online to their customers who prefer to use the anonymous features of UCO cards over traditional credit cards where purchases are tied to a specific individual.

As an example, a batch of UCO cards may be supplied to online vendors with the account number hidden from view in special concealer packaging. This packaging conceals the account numbers, while clearly displaying a card batch number, denomination, and UPC code for the UCO card.

Although a vendor may not have access to the individual card account numbers, they may still sell these cards to their customers by entering the UPC code that is printed on the outside of the card packaging.

Thereafter, the online consumer may then remove the concealer packaging exposing the card account and PIN number. The consumer may then activate the card through a web site, such as the Universal Cash Online web site.

The associated credit card company, or other issuer of the UCO card, would know that they had sold, for example, a $50 card to John Doe. However, they would not be aware of the account number of the card. Therefore, John Doe is now free to perform online purchases anonymously using the UCO card.

The present invention, through Universal Cash Online Direct Link Services, allows for individual consumers to have the ability to chat and share information online directly with each other on a one-to-one basis via a web portal such as the UCO web portal. These services are offered to allow for open consumer communication. This general exchange of information and opinions helps consumers to stay abreast of activities occurring in the cyber-marketplace.

Furthermore, consumers may form chat communicates pertaining to various specific topics.

Figure 1:
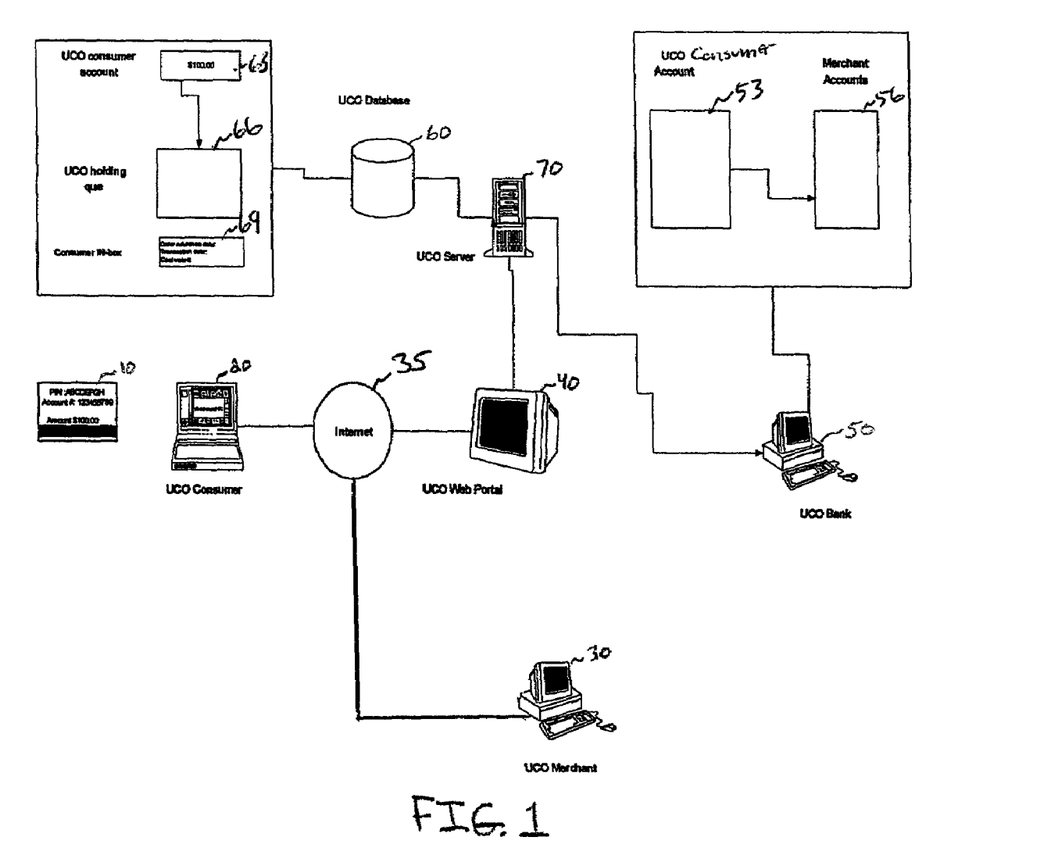
FIG. 1 shows a UCO payment system in accordance with the present invention.

FIG. 1 shows a UCO payment system in accordance with the present invention. A description of the components comprising the payment system will first be described, with a description of the interaction between components following thereafter.

IEBD 10 may be a card, or any other form of readable media, including a virtual card, which represents a dollar value. According to an embodiment of the present invention, IEBD 10 is not registered in the name of a particular individual. IEBD 10 may be used to purchase goods and/or services by whoever possesses the correct password or PIN written or displayed on the card.

Consumer 20 is an individual who has purchased an IEBD 10 at any one of various points of sale, including off-line and on-line points of sale.

Merchant 30 is a merchant which has agreed to terms and conditions outlined for accepting IEBDs.

Web Portal 40 is a website which offers consumers many e-commerce functions and services, including payment transactions.

Bank 50 is a financial institution which holds UCO consumer payment accounts 53 and various merchant accounts 56.

BDD 60 is software that processes internal payment transactions and coordinates payments from UCO Consumer 20 to UCO merchant 30.

Server 70 is a computer used to coordinate processes between BDD 60 and external inputs including: web portal 40, bank 50, merchant 30, and consumer 20.

Consumer 20 elects to purchase goods and/or services from web portal 40. Web portal 40 displays an itemized description of the products or services in the UCO shopping cart along with pertinent transaction information including, but not limited to including: amount to complete transaction (cost, tax, shipping, tariff, etc.), shipping address, and merchant name and address. Web portal 40 prompts, for example:

"Is this correct? ______"
"Do you wish to continue? ______"
"Enter Account#? ______"

Upon receiving the Account #, UCO server 70 queries UCO database 60 to determine if funds are available to complete the transaction.

If sufficient funds are present, UCO web portal 40 may prompt, for example:

"Enter PIN or Password to begin transaction ______"

Once the PIN or Password has been verified, UCO server 70 connects with UCO merchant 30 via Internet 35.

Information from the shopping cart is sent to UCO merchant 30. The web portal may prompt, for instance:

"Is this correct? ______"
"Do you wish to continue? ______"

If UCO merchant 30 wishes to continue, UCO web portal 40 instructs UCO merchant 30 to initiate the order and transmit "order reference data" to UCO server 70. Next, the merchant initiates the order, and transmits "order reference data" as outlined in a standard terms and conditions statement.

Once the "order reference data" has been received, UCO server 70 processes the information and initiates an internal funds transfer. This is accomplished by the following operations:

1. Funds are transferred from the account associated with IEBD 10 to a UCO holding queue 66.

2. The purchase amount is deducted from UCO consumer customer account 63.
3. Transaction data is processed and deposited in, for instance, consumer IN-box 69.

At this point a UCO consumers input is no longer required to complete the transaction. UCO web portal 40 prompts UCO consumer 20: "please change your PIN or Password before logging off."

In order to receive payment, UCO merchant 30 is required to transmit the "confirmation data" outlined in the agreed upon terms and conditions. UCO merchant 30 transmits "confirmation data" to UCO server 70.

UCO server 70 processes the "confirmation data", and subtracts the "transaction amount" from UCO holding queue 66, and deposits "confirmation data" in consumer's IN-box 69.

UCO server 70 establishes a secure connection with UCO bank 50 to initiate an "external" funds transfer. UCO server 70 instructs UCO bank 50 to transfer the transaction amount from the UCO account to the merchant account.

UCO bank 50 then performs the transfer of funds, by, for example, transmitting "transaction data" to UCO server 70.

UCO server 70 processes the "transaction data, transmits the "transaction data" to UCO merchant 30 for verification, and deposits the final confirmation in UCO Consumer IN-box 69.

Figure 2:
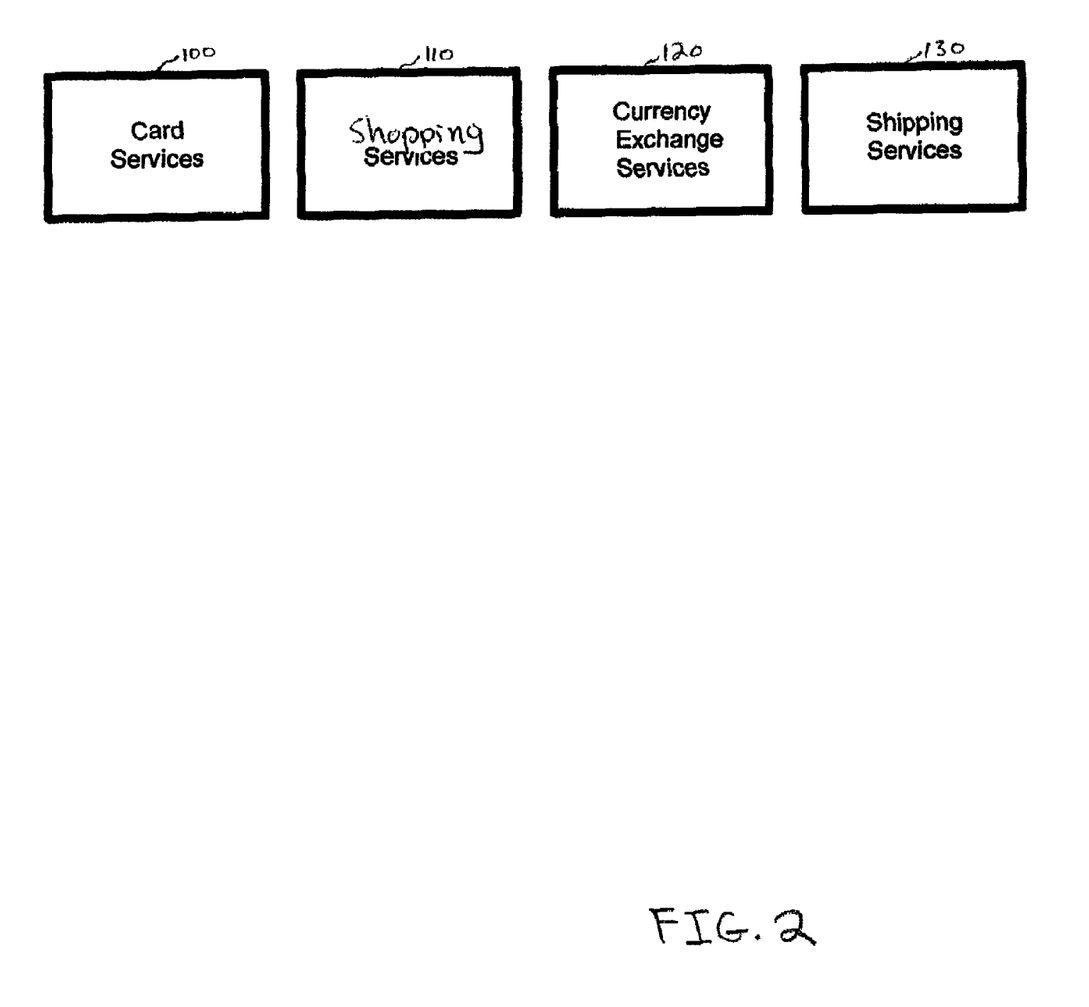
FIG. 2 shows user-selectable UCO services in accordance with the present invention.

FIG. 2 shows user-selectable UCO services in accordance with the present invention. Card services 100 allows a UCO customer to purchase cards on-line and access their existing account or accounts. UCO customers may purchase an UCO card on-line using traditional methods of payment. Further, card services 100 allows users to change PINs, access E-mail services, consolidate cards, access interactive services, check card balances, and view their transaction history.

The present invention not only allows international and domestic consumers the ability to spend cash on the Internet, but it also streamlines the online shopping experience by providing consumers a multitude of services. Shopping services 110 enables customers to shop by country or location, shop by language, shop by merchant, and shop by product or service, and to comparison shop, all using a UCO shopping cart.

The value of an IEBD may be linked to a base currency of a particular country. Currency exchange services 120 allows a user to pay an appropriate exchange rate to convert his or her type of currency into the equivalent base currency if the user's currency is different than the base currency.

Shipping services 130 allows consumers the ability to shop and ship from one location, and includes services including, but not limited to: a shipping fee calculator, package tracking, clearing and forwarding services, marine shipping insurance, and links to carrier websites.

Figure 3:
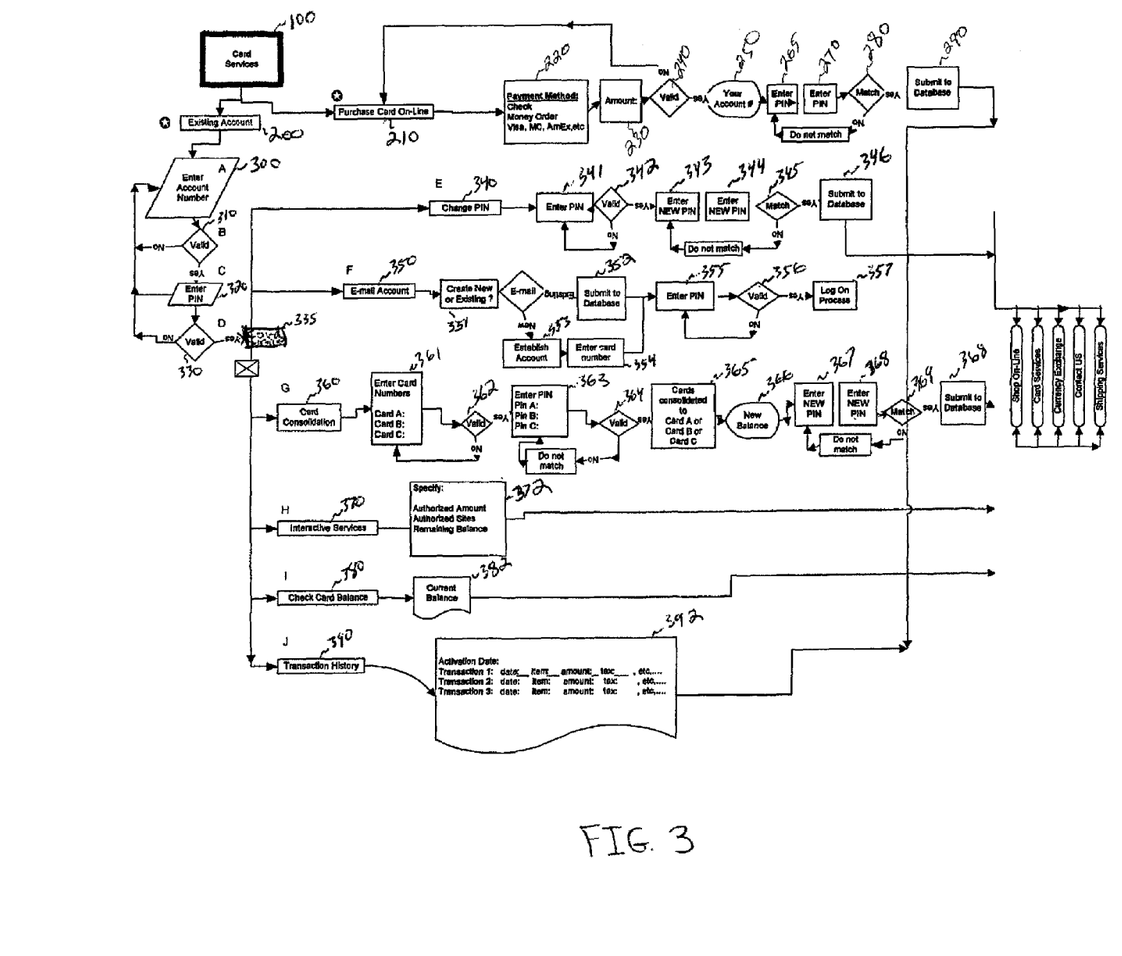
FIG. 3 is a flowchart illustrating card service functions in accordance with the present invention.

FIG. 3 is a flowchart illustrating card service functions in accordance with the present invention. Upon selecting card services 100 by, for example, clicking a "card services" icon, the user may select to access an existing account at operation 200, or purchase a card on-line at operation 210.

If a user decides to purchase a card on-line, processing proceeds to operation 220, at which point the user selects a method of payment for purchasing a UCO card on-line using, for example, check, money order, or a credit card. At operation 230, the user selects a monetary amount to purchase the card for. Operation 240 determines if the user's choice of payment is valid, by, for example, making sure that sufficient funds are available in the user's selected choice of payment account. If so, then processing proceeds to operation 250; otherwise, processing is directed back to operation 210.

At operation 250, the user is assigned a UCO account number. At operation 265, the user is prompted to enter a PIN for the new account, and at operation 270, the user is prompted to enter the new PIN again for verification purposes. At operation 280, it is determined whether the two PINs entered at operations 265 and 270 match. If the two PINs match, then the entered information is submitted to UCO database 60 at operation 290 for storage and the user is presented with a main UCO services menu. If, on the other hand, the two PINs do not match, then processing is directed back to operation 265.

If the user decides to access an existing account, then processing proceeds to operation 300, where the user is prompted to enter his or her card account number.

Processing next proceeds to operation 310, where UCO database 60 is queried to determine the validity of the entered card account number. If the card account number matches a number in UCO database 60, then processing proceeds to operation 320. Otherwise, if the card number does not match a number in UCO database 60, then processing is directed back to operation 300, where the user may enter another account number.

At operation 320, the user is prompted to enter a PIN. Processing proceeds to operation 330, at which point UCO database 60 is queried to determine the validity of the entered PIN. If the PIN matches the PIN stored in UCO database 60 associated with the entered account number, then processing proceeds to operation 335, the card services sub-menu. Otherwise, if the PIN is determined to be invalid, then processing is directed back to operation 320.

The card services sub-menu at operation 335 gives a user at least the following options: Change PIN, E-mail services, Card Consolidation, Interactive Services, Check Card Balance, and Transaction History.

If the user opts to change his or her PIN, then processing proceeds to operation 340, and the user is prompted to enter a current PIN into the system at operation 341. After entry, UCO database 60 is queried at operation 342 to determine the validity of the entered PIN. If the PIN matches the PIN stored in UCO database 60 associated with the user's entered account number (at operation 300), then processing proceeds to operation 343. Otherwise, if the PIN does not match the PIN stored in UCO database 60 associated with the user's entered account number (at operation 300), then processing is directed back to operation 341. According to an embodiment of the present invention, three incorrect attempts to enter a correct PIN will signal a red flag for improper behavior.

At operation 343, the user is prompted to enter the new PIN, and at operation 344, the user is prompted to enter the new PIN again for verification purposes. At operation 345, it is determined whether the two PINs entered at operations 343 And 344 match. If the two PINs match, then the entered information is submitted to UCO database 60 for storage at operation 346. If, on the other hand, the two PINs do not match, then processing is directed back to operation 343.

From the card services sub-menu at operation 335, if the user chooses "E-mail Services," then processing proceeds to operation 350. At operation 351, the user is given the option of creating an e-mail account or using an already existing e-mail account. If the user chooses to use an existing account, then processing proceeds to operation 352, at which point existing account holders are instructed to input an existing e-mail address into a given field. If instead the user opts to create an e-mail account, then processing proceeds to operation 353 at which point non-account holders are provided with an anonymous application form in which to create their account. After the account is established, users are requested to enter their new account number at operation 354.

At operation 355, the user is prompted to enter a proper PIN into the given field. At operation 356, UCO database is queried to determine the validity of the entered PIN. If the PIN matches the PIN coinciding with the one stored in UCO database 60 for the entered e-mail account, then processing proceeds to operation 357, where users are presented with an e-mail sub-menu after a log on process is completed. If, however, the entered e-mail PIN does not match its corresponding e-mail account stored in UCO database 60, then processing is directed back to operation 355. According to an embodiment of the present invention, 3 incorrect attempts will signal a red flag for improper behavior.

From the card services sub-menu at operation 335, if the user chooses "Card Consolidation," then processing proceeds to operation 360. Card consolidation allows a user to consolidate the value of multiple cards into one card. At operation 361, the user is prompted to enter the account numbers of the cards that he/she wants consolidated. After all the card account numbers are entered, then processing proceeds to operation 362, where UCO database 60 is queried to determine the validity of the account numbers.

If the entered card account numbers match account numbers in UCO database 60, then processing proceeds to operation 363; otherwise, processing is directed back to operation 361, at which point the user may attempt to enter valid account numbers again. According to an embodiment of the present invention, three incorrect attempts will signal a red flag for improper behavior.

At operation 363, the user is prompted to enter valid PINs for each account number entered at operation 361. After all PINs are entered, processing proceeds to operation 364.

At operation 364, UCO database 60 is queried to determine the validity of PINs entered at operation 363. If the entered PINs match the PINs stored in the UCO database 60 associated with the entered account numbers, then processing proceeds to operation 365. Otherwise, processing is directed back to operation 363.

At operation 365, card balances and transaction histories are consolidated to one of the existing UCO cards.

At operation 366, the new balance is displayed along with card information.

At operation 367, the user is given the option of changing the PIN of the of the consolidated account. At operation 367, the user is prompted to enter the new PIN, and at operation 368, the user is prompted to enter the new PIN again for verification purposes. At operation 369, it is determined whether the two PINs entered at operations 367 And 368 match. If the two PINs match, then the entered information is submitted to UCO database 60 for storage at operation 368. If, on the other hand, the two PINs do not match, then processing is directed back to operation 367.

From the card services sub-menu at operation 335, if the user chooses "Interactive Services," then processing proceeds to operation 370. Interactive services are offered for additional levels of security. At operation 372, a user is given the following options, including but not limited to: "Authorize Amount" enables a user to authorize a specific amount to be used per purchase—for example, parents may customize their child's card to allow for purchases of no more than $15 each; "Authorize Sites" allows a user to authorize the card to be used on certain sites—for example, parents may customize their child's card to allow for purchases at the Disney store, Toys R Us, and Amazon.com; and "Remaining Balance" allows users to authorize the specific amount to be used on multiple purchases—for example, parents may give their child a $100 card and customize the card to allow for purchases totaling no more than $25.00.

From the card services sub-menu at operation 380, if the user chooses "Check Card Balance," then processing proceeds to operation 380. Operation 382 displays the current balance of a card to the user.

From the card services sub-menu at operation 390, if the user chooses "Transaction History," then processing proceeds to operation 390. Operation 392 displays a complete history of card transactions.

Figure 4:
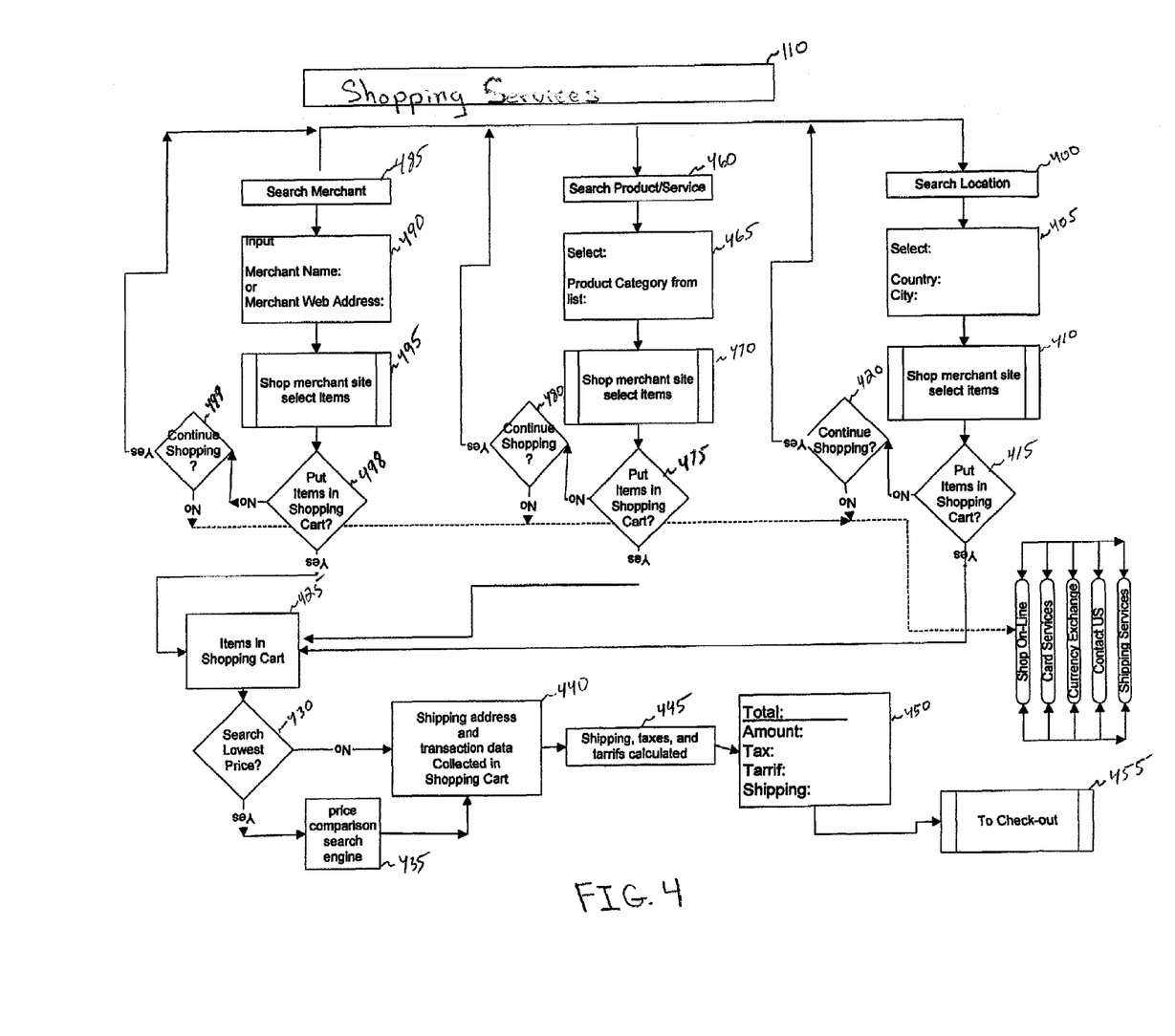
FIG. 4 is a flowchart illustrating shopping service functions in accordance with the present invention.

FIG. 4 is a flowchart illustrating shopping service functions in accordance with the present invention. Shopping services 110 enables customers to shop by country or location, shop by language, shop by merchant, and shop by product or service, and to comparison shop, all using a UCO shopping cart. If a user chooses to shop by location, then processing proceeds to operation 400. At operation 405, the user may select a location by country and city, for example. At operation 410, the user shops merchant sites in the selected location and selects which items he or she wants to buy. At operation 415, the user is given the option of placing the selected item or items into a shopping cart. If the user decides to place the selected items in a shopping cart, then processing proceeds to operation 425, where the selected items are placed in a virtual shopping cart for temporary storage. Otherwise, processing proceeds to operation 420, at which point the user is given the option to continue shopping. If the user decides to continue shopping, then the user may select to continue shopping by location at operation 400, continue shopping by product/service at operation 460, or continue shopping by merchant at operation 485. Otherwise, the user is presented with the main menu as depicted in FIG. 2. According to another embodiment of the present invention, the user may be presented with a main menu comprising a shop on-line selection, a card services selection, a currency exchange selection, and a shipping services selection.

After the items are placed in the shopping cart at operation 425, processing proceeds to operation 430, where the user is given the option of searching for the lowest price for all of the items in the shopping cart. If the user opts to search for the lowest price, then processing proceeds to operation 435 at which point a price comparison search engine is used to select those merchants having the lowest price for the items stored in the shopping cart, and processing next proceeds to operation 440. If, on the other hand, the user does not choose to search merchants for the lowest price of the shopping cart items, then processing proceeds directly to operation 440.

At operation 440, the shipping address of the user is collected and the transaction data collected in the shopping cart are used to calculate shipping costs, taxes, and tariffs at operation 445. From operation 445, processing proceeds to operation 450, at which point the total charges are displayed to the user including the amount of the selected item or items, and tax, tariff, and shipping charges. At operation 455, the user proceeds to checkout, at which point the total charges are deducted from the user's UCO account.

If a user chooses to shop by product/service, then processing proceeds to operation 460. At operation 465, the user selects which product or service categories he or she is interested in. At operation 470, merchant sites are chosen which have the selected products/services, and the user shops those merchant sites to select items to purchase. At operation 475, the user is given the option of placing the selected item or items into a shopping cart. If the user decides to place the selected items in a shopping cart, then processing proceeds to operation 425, where the selected items are placed in a virtual shopping cart for temporary storage. Otherwise, processing proceeds to operation 480, at which point the user is given the option to continue shopping. If the user decides to continue shopping, then the user may select to continue shopping by location at operation 400, continue shopping by product/service at operation 460, or continue shopping by merchant at operation 485. Otherwise, the user is presented with the main menu as depicted in FIG. 2. According to another embodiment of the present invention, the user may be presented with a main menu comprising a shop on-line selection, a card services selection, a currency exchange selection, and a shipping services selection.

If a user chooses to shop by merchant, then processing proceeds to operation 485. At operation 490, the user enters the desired merchant's name or web address. At operation 495, the merchant site is contacted and the user is able to select items from the chosen merchant site. At operation 498, the user is given the option of placing the selected item or items into a shopping cart. If the user decides to place the selected items in a shopping cart, then processing proceeds to operation 425, where the selected items are placed in a virtual shopping cart for temporary storage. Otherwise, processing proceeds to operation 499, at which point the user is given the option to continue shopping. If the user decides to continue shopping, then the user may select to continue shopping by location at operation 400, continue shopping by product/service at operation 460, or continue shopping by merchant at operation 485. Otherwise, the user is presented with the main menu as depicted in FIG. 2. According to another embodiment of the present invention, the user may be presented with a main menu comprising a shop on-line selection, a card services selection, a currency exchange selection, and a shipping services selection.

Figure 5:
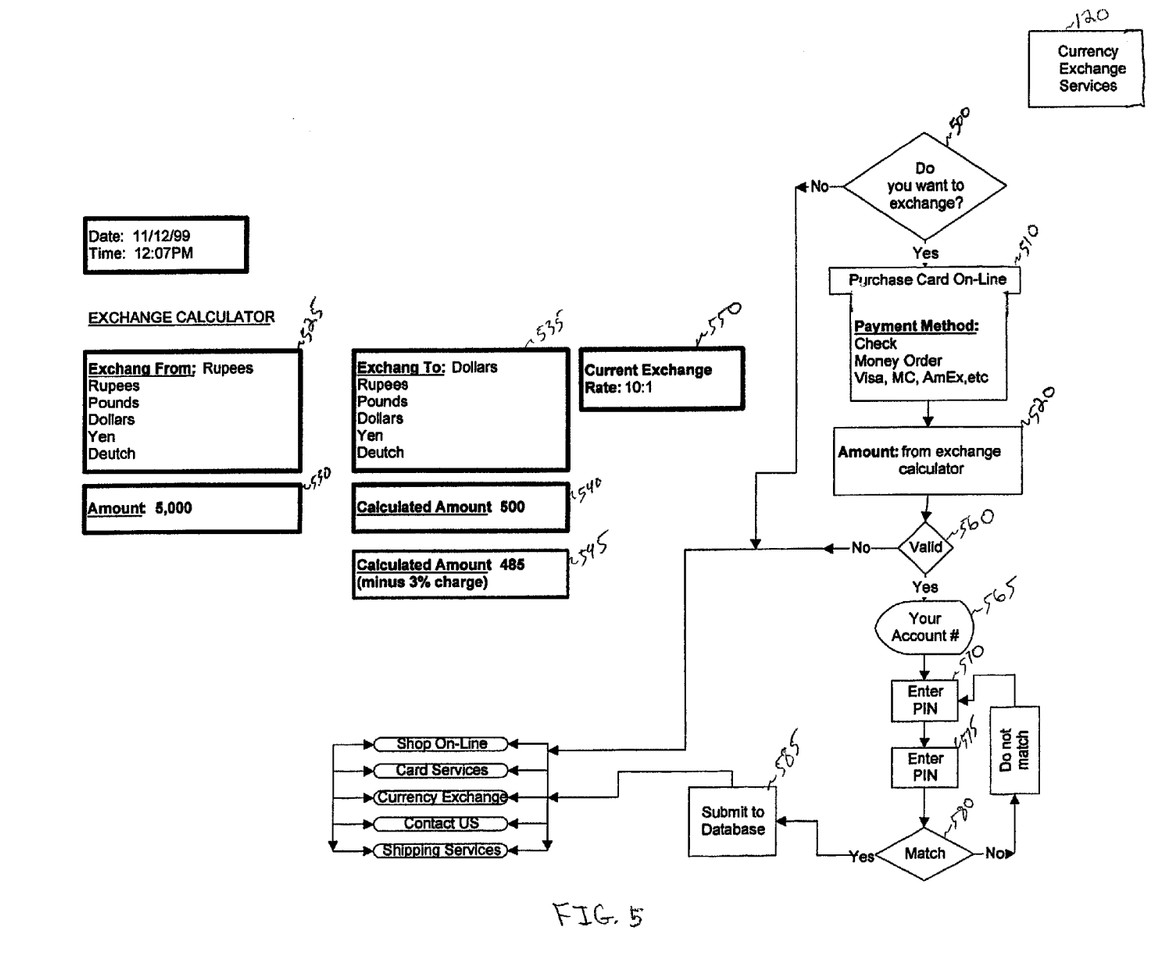
FIG. 5 is a flowchart illustrating currency exchange functions in accordance with the present invention.

FIG. 5 is a flowchart illustrating currency exchange functions in accordance with the present invention. Currency exchange services 120 allows a user to pay an appropriate exchange rate to convert his or her type of currency into the equivalent base currency if the user's currency is different than the base currency. At operation 500, the user is prompted to determine if he or she desires to exchange currency. If the user does not want to exchange currency, then the user is presented with a main UCO services menu. Otherwise, processing proceeds to operation 510, at which point the user purchases a UCO card on-line using, for example, check, money order, or a credit card. At operation 520, a calculated exchange amount is determined based on user input. For example, as shown in screen 525, a user selects a currency to exchange from after viewing a list of currencies, including but not limited to: rupees, pounds, dollars, and yen. Furthermore a user enters an exchange amount as shown in screen 530. At screen 535, the user selects the currency to exchange to, selected from a list of currencies. At screen 540, the calculated amount of the exchange to currency is displayed to the user, and at screen 545, the calculated amount minus an optional surcharge is displayed to the user. Optionally, the currency exchange rate is also displayed to the user at screen 550.

At operation 565, the user is prompted to enter a PIN for the new account. At operation 570, the user is prompted to enter the new PIN, and at operation 575, the user is prompted to enter the new PIN again for verification purposes. At operation 580, it is determined whether the two PINs entered at operations 565 and 570 match. If the two PINs match, then the entered information is submitted to UCO database 60 at operation 585 for storage and the user is presented with a main UCO services menu. If, on the other hand, the two PINs do not match, then processing is directed back to operation 570.

Figure 6:
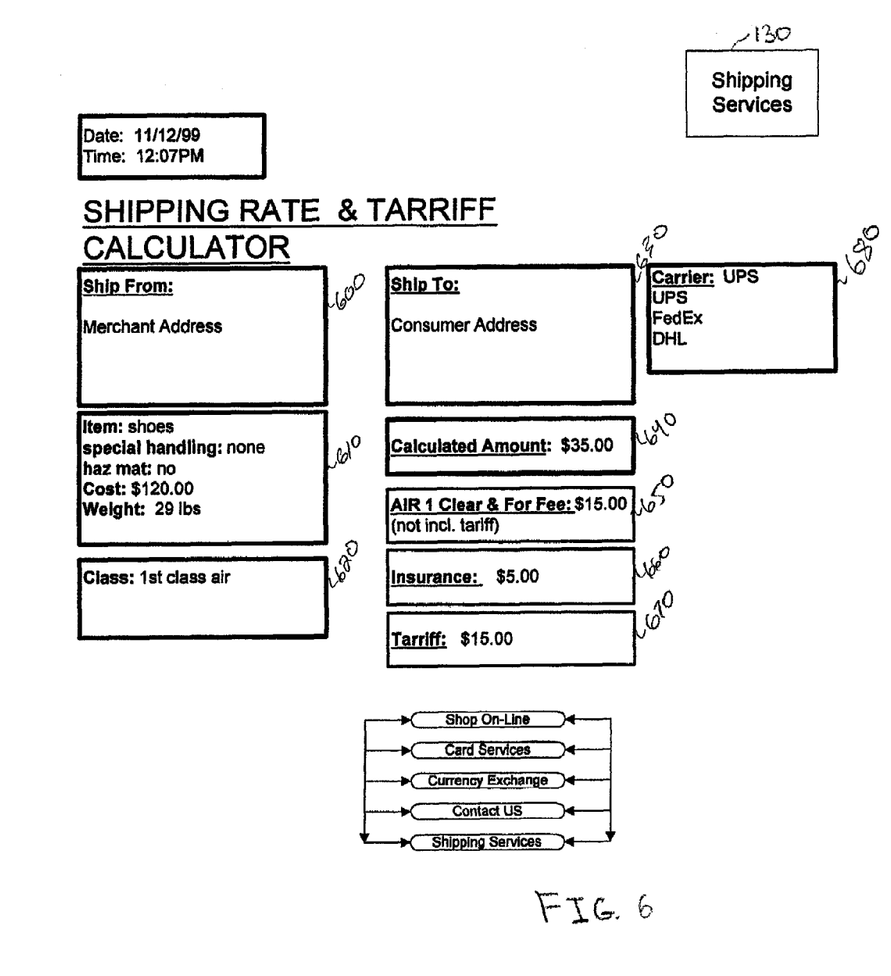
FIG. 6 is a flowchart illustrating shipping services functions in accordance with the present invention.

FIG. 6 is a flowchart illustrating shipping services functions in accordance with the present invention. Typically, information such as merchant address 600, item information 610, including the name of the item, special mail handling requirements (if any), cost of the item, and weight are all retrieved from the merchant site where the item was purchased from. The user is given the option of how the item will be delivered at screen 620. At screen 630, the consumer's address is displayed for verification purposes—this information may be retrieved from UCO database 60 based upon the user's account number. The calculated amount is displayed at screen 640, the AIR 1 Clear and For Fee is displayed at screen 650, insurance costs are displayed to screen 660, tariff charges are displayed at screen 670, and the user may select which carrier to use at screen 680.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An electronic transaction system, comprising:
   bearer bond means providing an online electronic bearer bond having a monetary value without linking the online electronic bearer bond to identity of a specific user;
   transaction means performing monetary transactions with said bearer bond as a payment by converting the monetary value of said bearer bond for use with existing payment protocols; and
   network means providing user access to said bearer bond means and said transaction means.

2. An electronic apparatus adapted for exchanging currency over a network, comprising:
   an electronic document for performing transactions using the electronic document as a payment by converting a value of said electronic document for use with existing payment protocols, the electronic document being provided without linking the electronic document to identity of a specific user and said transactions containing data information associated with said electronic document; and
   a database processing and storing said data information to perform said transactions over said network.

3. A method for creating a universally accepted form of payment using an electronic transaction system, comprising:
   selecting an item costing a first value in a first currency;
   converting the first value in the first currency into a second value in a second currency; and
   executing an electronic transaction by using the second value of the second currency as payment for the item without linking identity of parties to execute the electronic transaction, thereby creating a universal form of payment acceptable by any merchant that uses an existing payment protocol.

4. The method for creating a universally accepted form of payment in an electronic transaction according to claim 3, wherein a credit card is not used as payment for the item.

5. The method for creating a universally accepted form of payment in an electronic transaction according to claim 3, wherein a bank account is not used as payment for the item.

6. The method for creating a universally accepted form of payment in an electronic transaction according to claim 3, wherein an electronic bearer document is used as payment for the item.

7. The method for creating a universally accepted form of payment in an electronic transaction according to claim 3, wherein the first and second currencies are hard currencies.

8. An electronic transaction system, comprising:
   an electronic online bearer bond having a monetary value, the electronic online bearer bond being provided without being linked to identity of a specific user;
   a database for performing monetary transactions with said electronic online bearer bond as a payment by converting the monetary value of said bearer bond for use with existing payment protocols; and
   a network for providing user access to said electronic online bearer bond and said database.

9. A method of executing an electronic transaction using an interactive electronic bearer document, comprising:
   issuing the interactive electronic bearer document having a monetary value and assigning verification information to the issued interactive electronic bearer document without linking the verification information to identity of a specific user; and
   executing the electronic transaction using the issued interactive electronic bearer document as a form of payment by converting the monetary value of said bearer document for use with existing payment protocols upon presentation of the assigned verification information.

10. A method of executing an electronic transaction via an electronic transaction system using an interactive electronic bearer document, comprising:
    executing the electronic transaction using the interactive electronic bearer document as a form of payment with respect to an existing accepted form of payment, where the interactive electronic bearer document is converted to a universally acceptable payment form by performing necessary operations by any user and used as the form of payment for the electronic transaction.

11. A method of creating a universally accepted form of payment for an electronic transaction, comprising:
    receiving an electronic document having a first form of payment for the electronic transaction from a user, the electronic document being non-specific to identity of the user; and
    converting a value of the first form of payment into a universally accepted form of payment, transferring the universally accepted form as a second form of payment to a merchant and executing the electronic transaction, thereby creating a universally accepted form of payment as requested by the user.

12. A method of creating a universally accepted form of payment, comprising:
    transmitting an electronic document having a set of predefined protocols as a form of payment for a transaction, said document being transmitted without requiring indication of identity of a user and having a universally acceptable value; and
    using the electronic document as a payment to a merchant employing an existing payment protocol including credit cards.

* * * * *